(12) United States Patent
Purcell

(10) Patent No.: US 6,393,453 B1
(45) Date of Patent: May 21, 2002

(54) CIRCUIT AND METHOD FOR FAST SQUARING

(75) Inventor: Stephen C. Purcell, Mountain View, CA (US)

(73) Assignee: ATI International SRL (BB)

( * ) Notice: Subject to any disclaimer, the term of this patent is extended or adjusted under 35 U.S.C. 154(b) by 0 days.

(21) Appl. No.: 09/159,271

(22) Filed: Sep. 22, 1998

(51) Int. Cl.[7] .................................................. G06F 7/38
(52) U.S. Cl. ...................................................... 708/606
(58) Field of Search ................................ 708/606, 227, 708/620, 625, 626

(56) References Cited

U.S. PATENT DOCUMENTS

| | | | | |
|---|---|---|---|---|
| 3,610,906 A | * | 10/1971 | Stampler | ..................... 708/625 |
| 5,337,267 A | * | 8/1994 | Colavin | ..................... 708/606 |
| 5,629,885 A | * | 5/1997 | Pirson et al. | ............... 708/606 |
| 6,018,758 A | * | 1/2000 | Griesbach et al. | .......... 708/606 |

* cited by examiner

Primary Examiner—Chuong Dinh Ngo
(74) Attorney, Agent, or Firm—Vedder, Price, Kaufman and Kammholz

(57) ABSTRACT

A circuit for squaring an n-bit value includes a partial product bit generator which logically AND's a bit of the n-bit value having a weight $2^k$ (k is an integer) with the same bit of weight $2^k$ to generate a partial product bit of weight $2^{2k}$. Another partial product bit generator receives and logically AND's a bit of the n-bit value of weight $2^k$ and a bit of weight $2^m$ (m is an integers) to generate a partial product bit of weight $2^{(k+m+1)}$. The second partial product bit generator may be the only partial product bit generator in the squaring circuit to logically AND the bit of weight $2^m$ and the bit of weight $2^k$. The circuit may also include other partial product bit generators. However, the required number of partial product bit generators is significantly reduced by about ½ compared to the conventional squaring circuit. The associated Wallace tree structure is simplified and made smaller because of the reduction in partial product bits. Therefore, a faster and smaller circuit for squaring is provided.

2 Claims, 3 Drawing Sheets

130

CIRCUIT AND METHOD FOR FAST SQUARING

CROSS-REFERENCE TO RELATED APPLICATIONS

This is related to Application Serial Number (not yet assigned, Ser. No. 09/159,271 filed the same day herewith, and incorporated by reference in its entirety.

BACKGROUND OF THE INVENTION

It is often necessary to compute the square of an n-bit (e.g., a 12-bit) value.

One conventional squaring method uses regular school book multiplication in which a 12-bit value is both the multiplier and the multiplicand as in the following example.

```
           001110011010          (922)
          x001110011010          (922)
           000000000000          0
            001110011010         1
           000000000000          2
          001110011010           3
         001110011010            4
        000000000000             5
       000000000000              6
      001110011010               7
     001110011010                8
    001110011010                 9
   000000000000                  a
 +000000000000                   b 000011001111100010100100        (850,084)
 22221111111111
 321098765432109876543210        (Column #)
```

Hereinafter, the k'th bit from the right in the multiplicand and the m'th bit from the right in the multiplier are respectively referred to as "multiplicand bit k" and "multiplier bit m". For example, the italicized bit in the above multiplication is referred to as "multiplicand bit 2". Furthermore, the k'th bit from the right in the m'th partial product is referred to as "partial product bit mk" (or "bit mk"). For example, the underlined bit in the a'th ($a_{16}$, $b_{16}$, $C_{16}$, $d_{16}$, $e_{16}$ and $f_{16}$ as used herein, are a hexadecimal numerals respectively equal to $10_{10}$, $11_{10}$, $12_{10}$, $13_{10}$, $14_{10}$, and $15_{10}$, partial product is referred to as "partial product bit a9" (or "bit a9").

A partial product bit generator mk such as an AND gate mk is used to generate each partial product bit mk. One input terminal of each AND gate mk receives multiplicand bit k while the other input terminal receives multiplier bit m.

A circuit that implements this method requires a minimum of $n^2$ (e.g., 144) AND gates to square an n-bit value. Additionally, in a Wallace tree of 3:2 carry save adders, each column may require up to n−2 (e.g., 10) carry save adders. If each column has the same number of carry save adders, a total of 2n (e.g., 24) columns may require up to (2n)(n−2)=$2n^2$−4n (e.g., 240) carry save adders. These AND gates and carry save adders occupy significant space on a die.

It is desirable to reduce the number of partial product bit generators and carry save adders required to square. By so doing, the partial product bit generator array and accompanying Wallace tree are made smaller and faster than in the conventional squaring circuit.

SUMMARY OF THE INVENTION

A circuit for squaring an n-bit value in accordance with the present invention is provided. The circuit includes a partial product bit generator which logically AND's a bit of the n-bit value of weight $2^k$ (k is an integer) with the same bit of weight $2^k$ to provide a partial product bit of weight $2^{2k}$ on an output terminal. Another partial product bit generator has at least two input terminals configured to receive a bit of the n-bit value of weight $2^k$ and a bit of weight $2^m$ (m is an integers). The second partial product bit generator logically AND's these bits and generates a partial product bit of weight $2^{(k+m+1)}$. In one embodiment, the second partial product bit generator is the only partial product bit generator in the squaring circuit to logically AND the bit of weight $2^m$ and the bit of weight $2^k$.

A method in accordance with the present invention is also provided by generating a first partial product bit of weight $2^{2k}$ from a bit of weight $2^k$ in a first partial product bit generator. A bit of weight $2^k$ is logically AND'ed with a bit of weight $2^m$ to generate a second partial product bit of weight $2^{(k+m+1)}$ in a second partial product bit generator. Another method includes providing the first and second partial product bit generators described above.

The circuit may also include other partial product bit generators. However, the required number of partial product bit generators is significantly reduced by about ½ compared to the conventional squaring circuits. For example, is squaring a 12-bit value, the number of partial product bit generators needed is reduced from 144 to 78, and even to 66 in one embodiment. The associated Wallace tree structure is simplified and made smaller because of this reduction in partial product bits. Therefore, a faster and smaller circuit for squaring is provided.

The present invention and its advantages and features will be more fully understood in light of the following detailed description and the claims.

DESCRIPTION OF THE INVENTION

Throughout the figures and description, like reference symbols indicate like elements unless otherwise noted.

Partial product bits in the conventional school book method of squaring are "mirrored". For example, in the following multiplication, the italicized partial product bits are vertically mirrored about the bolded partial product bits.

```
           001110011010          (922)
          x001110011010          (922)
           000000000000          0
            001110011010         1
           000000000000          2
          001110011010           3
         001110011010            4
        000000000000             5
       000000000000              6
```

-continued

| | |
|---|---|
| 001110011010 | 7 |
| 001110011010 | 8 |
| 001110011010 | 9 |
| 000000000000 | a |
| +000000000000 | b |
| 000011001111100010100100 | (850,084) |
| 222211111111 | |
| 321098765432109876543210 | (Column #) |

The bolded partial product bits (hereinafter, "the mirror bits") are generated by partial product bit generators that multiply a multiplicand bit of weight $2^k$ and a multiplier bit of the same weight, where k is the set of integers from 0 to n−1. The k'th bit from the right in the m'th partial product is referred to as "partial product bit mk" (or "bit mk"), where m is the set of integers from 0 to n−1. The partial product bits to the upper left and lower right of the mirrored bits are respectively referred to as "the upper bits" and "the lower bits". For each upper (or lower) bit mk, there exists exactly one corresponding lower (or upper) bit km of equal weight and magnitude.

Squaring may also be performed by deleting all of the lower bits ("right bits") and by shifting the upper bits 1 bit left as in the following example.

| | |
|---|---|
| 001110011010 | (922) |
| x001110011010 | (922) |
| 00000000000 0 | 0 |
| 0011100110 1 | 1 |
| 000000000 0 | 2 |
| 00111001 1 | 3 |
| 0011100 1 | 4 |
| 000000 0 | 5 |
| 00000 0 | 6 |
| 0011 1 | 7 |
| 001 1 | 8 |
| 00 1 | 9 |
| 0 0 | a |
| +0 | b |
| 000011001111100010100100 | (850,084) |
| 222211111111 | |
| 321098765432109876543210 | (Column #) |

Each partial product bit generator that receives multiplicand bit k for the non-mirror bits receives a bit of weight $2^k$ and a bit of weight $2^m$ and generate a bit of weight $2^{(k+m+1)}$. When deleting all of the lower bits, m is an integer greater than 0.

In the above method, the number of product bits is reduced from $n^2$ (e.g., 144) in the conventional method to n(n+1)/2 (e.g., 78), a reduction of almost 50%. Furthermore, the maximum number of partial product bits per column is [(n/2)+1] truncated (e.g., 7 if n equals 12). Therefore, the maximum number of carry save adders required for a column is reduced from n−2 (e.g., 10) to [(n/2)−1] truncated (e.g., 5).

Figure 1:
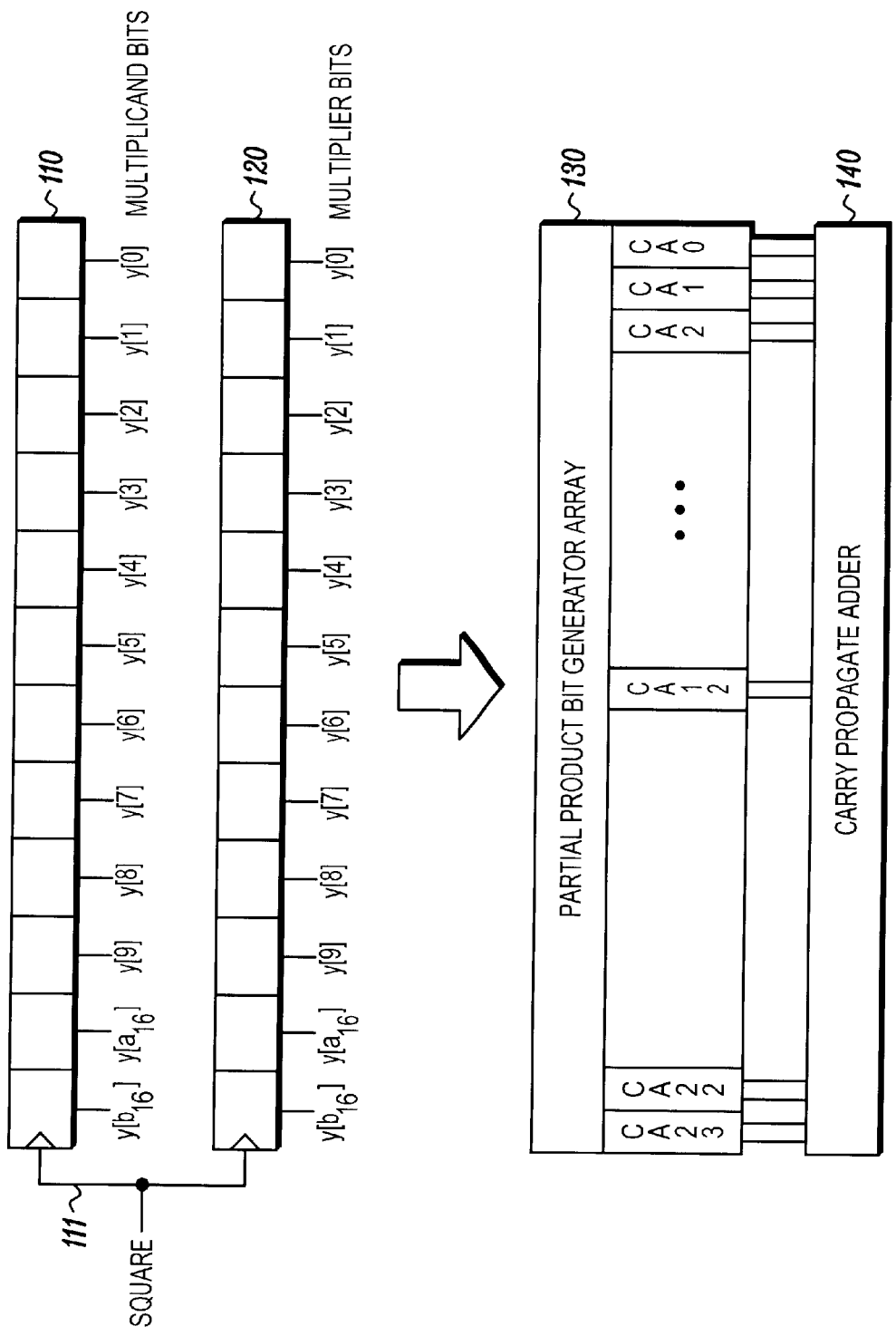
FIG. 1 shows a block diagram of a squaring circuit according to the present invention.

FIG. 1 shows a block diagram of a circuit that accomplishes the above described squaring. In FIG. 1, two 12-bit registers 110 and 120 are each configured to store the same 12-bit value y[$b_{16}$:0] to be squared. Each bit y[q] of the 12-bit value y[$b_{16}$:0] has a weight $2^q$, where for q is the set of integers from 0 to $b_{16}$. Register 110 has lead lines corresponding to each bit y[$b_{16}$:0] as does register 120. In one embodiment, only one register 110 is used to provide bits y[$b_{16}$:0]. In another embodiment, bits y[$b_{16}$:0] are provided by a circuit (not shown) other than a register.

In response to a signal SQUARE on line 111, signals representing each bit of value y[$b_{16}$:0] are provided to a partial product bit generator array 130 ("array 130"). Array 130 generates partial product bits and provides the partial product bits to a respective one of column adders CA0 to CA23 that corresponds to the weight of the partial product bit. The column adders CA0 to CA23 may provide the resulting square in redundant form (i.e., a carry and sum bit for each bit place), in which case the result is provided to a carry propagate adder 140.

Figure 2:
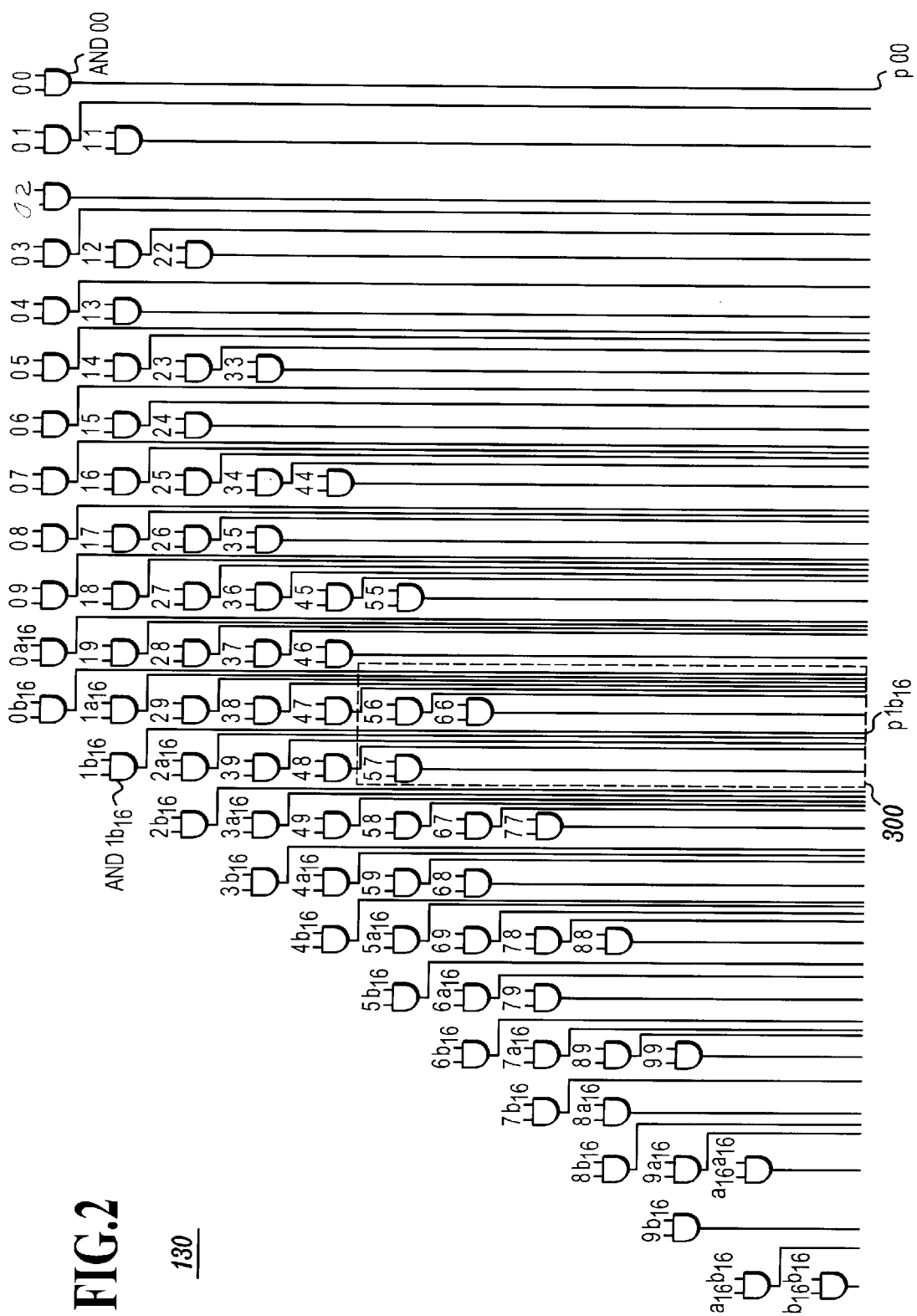
FIG. 2 is a detailed gate level diagram of one embodiment of the partial product bit generator array of FIG. 1.

FIG. 2 is a detailed gate level diagram of array 130 which may be, for example, an array of AND gates. Each AND gate mk (e.g., AND gate $1b_{16}$ in FIG. 2) has two numbers m and k (e.g., 1 and $b_{16}$) associated with its input terminals. The left number m (e.g., 1 for AND gate $1b_{16}$) indicates that one input terminal is configured to receive bit y[m] (e.g., bit y[1]) from registers 110 or 120. The right number k (e.g., $b_{16}$ for AND gate $1b_{16}$) indicates that the other input terminal is configured to receive bit y[k] (e.g., y[$b_{16}$]) from registers 110 or 120. Each AND gate mk receives bits y[m] and y[k] on its input terminal and provides bit mk on its output terminal. For example, AND gate $1b_{16}$ receives bits y[1] and y[$b_{16}$] and generates partial product bit $1b_{16}$. Likewise, AND gate 00 receives bit y[0] and provides partial product bit 00. The other AND gates and partial product bits are not labeled in FIG. 2 for clarity.

The column adders of FIG. 1 receive and add the partial product bits mk according to the following Table 1.

TABLE 1

| Column Adder | Partial product bits received | # of partial products |
|---|---|---|
| CA0 | 00 | 1 |
| CA1 | none | 0 |
| CA2 | 01, 11 | 2 |
| CA3 | 02 | 1 |
| CA4 | 03, 12, 22 | 3 |
| CA5 | 04, 13 | 2 |
| CA6 | 05, 14, 23, 33 | 4 |
| CA7 | 06, 15, 24 | 3 |
| CA8 | 07, 16, 25, 34, 44 | 5 |
| CA9 | 08, 17, 26, 35 | 4 |
| CA10 | 09, 18, 27, 36, 45, 55 | 6 |
| CA11 | 0$a_{16}$, 19, 28, 37, 46 | 5 |
| CA12 | 0$b_{16}$, 1$a_{16}$, 29, 38, 47, 56, 66 | 7 |
| CA13 | 1$b_{16}$, 2$a_{16}$, 39, 48, 57 | 5 |
| CA14 | 2$b_{16}$, 3$a_{16}$, 49, 58, 67, 77 | 6 |
| CA15 | 3$b_{16}$, 4$a_{16}$, 59, 68 | 4 |
| CA16 | 4$b_{16}$, 5$a_{16}$, 69, 78, 88 | 5 |
| CA17 | 5$b_{16}$, 6$a_{16}$, 79 | 3 |
| CA18 | 6$b_{16}$, 7$a_{16}$, 89, 99 | 4 |
| CA19 | 7$b_{16}$, 8$a_{16}$ | 2 |
| CA20 | 8$b_{16}$, 9$a_{16}$, $a_{16}a_{16}$ | 3 |
| CA21 | 9$b_{16}$ | 1 |
| CA22 | $a_{16}b_{16}$, $b_{16}b_{16}$ | 2 |
| CA23 | none | 0 |

Each column adder CA0 to CA23 receives the partial product bits as shown in Table 1 (plus carry in bits from the column to the right), and generates a sum and carry bit to be added by carry propagate adder 140 (FIG. 1) (and generates carry out bits to the column to the left).

As shown in Table 1, the maximum number of partial product bits received by any column adder is 7 received by column adder CA12. The maximum required number of 3:2 carry save adders needed to reduce the 7 partial product bits to a sum and carry value is only 5. Therefore, the above describes a circuit and method for squaring which reduces the number of required partial product bit generators by almost 50% compared to the prior art. This simplifies the adder tree and reduces the area of the adder tree needed to add the reduced number of partial product bits. Therefore, the above describes a squaring circuit that is faster and smaller than in conventional squaring.

In one embodiment, AND gates 00, 11, 22, 33, 44, 55, 66, 77, 88, 99, $a_{16}a_{16}$ and $b_{16}b_{16}$ are not used to generate respective partial product bits 00, 11, 22, 33, 44, 55, 66, 77, 88, 99, $a_{16}a_{16}$ and $b_{16}b_{16}$. Instead, bits y[0], y[1], y[2], y[3], y[4], y[5], y[6], y[7], y[8], y[9], y[$a_{16}$] and y[$b_{16}$] are provided unaltered as respective partial product bits 00, 11, 22, 33, 44, 55, 66, 77, 88, 99, $a_{16}a_{16}$ and $b_{16}b_{16}$. In this embodiment, the number of AND gates required to square is further reduced by n. For example, in squaring an n-bit value, the number of required AND gates is a mere n(n−1)/2 which equals 66 for a 12-bit value, a reduction by over ½ compared to the conventional circuit.

The maximum number of partial product bits per column may be reduced from [(n/2)+1] truncated (e.g., 7) to (n/2) truncated (e.g., 6) as is described hereafter. The reduction is accomplished by shifting one partial product bit from the column with the most partial product bits (e.g., column 12) to its more significant neighbor (e.g., column 13). The reduction is described with reference to FIG. 3A and FIG. 3B.

Figure 3A:
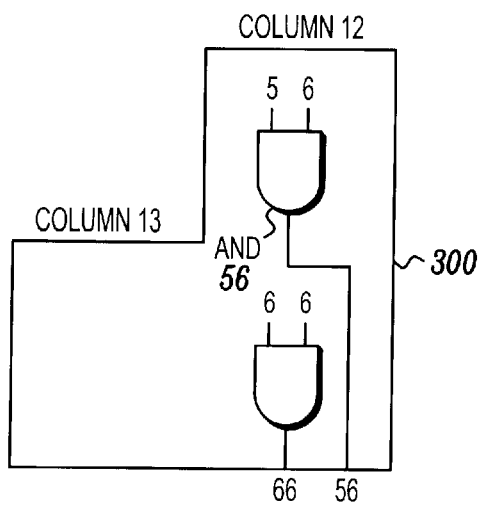
FIG. 3A shows a portion of the partial product bit generator array of FIG. 2.
Figure 3B:
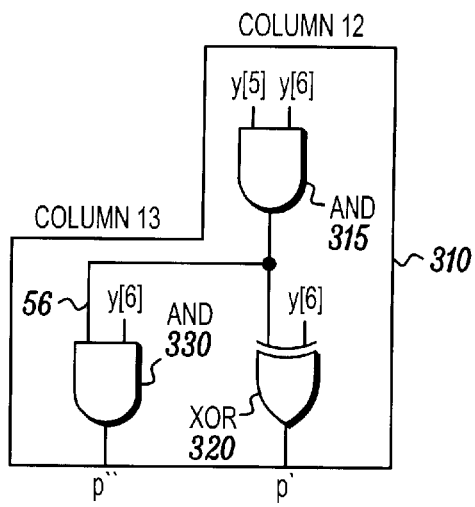
FIG. 3B shows a portion that replaces the portion of FIG. 3A.

FIG. 3A shows a portion 300 of array 130 that includes only AND gates 56 and 66. In portion 300, column 12 generates two partial product bits 56 and 66, while column 13 generates none. In FIG. 3B, portion 300 is replaced with a portion 310 in which column 12 generates only one partial product bit p', while column 13 also generates a partial product bit p". Although the total number of partial product bits does not change by replacing portion 300 with 310, the number of partial product bits generated by column 12 of the partial product bit generator array 130 is reduced from 7 to 6. The number of partial product bits generated by column 13 is increased from 5 to only 6. The maximum number of partial product bits generated by any one column of array 130 is thus reduced by 1 to 6. Thus, the maximum number of 3:2 carry save adders required per column is reduced to 4 for squaring a 12-bit value.

The following truth table (Table 2) shows the relationship between portion 310 input bits y[5] and y[6] and output partial product bits p' and p".

TABLE 2

| Input Bits | | bit | Output Bits | |
|---|---|---|---|---|
| y[5] | y[6] | 56 | p" | p' |
| x | 0 | 0 | 0 | 0 |
| 0 | 1 | 0 | 0 | 1 |
| 1 | 1 | 1 | 1 | 0 |

"X" means that the output bits p' and p" are not dependent on bit y[5] if bit y[6] is 0. Bit p' has a 1 value only if bit y[5] has a 0 value and bit y[6] has a 1 value. Bit p" has a 1 value only if both of bits y[5] and y[6] have a 1 value.

FIG. 3B shows a circuit (portion 310) that implements truth Table 2. An AND gate 315 logically AND's bits y[5] and y[6] to generate bit 56. Another AND gate 330 logically AND's bits 56 and y[6] to generate bit p". An XOR gate 320 logically XOR's bits 56 and y[6] to generate partial product bit p'.

Figure 3C:
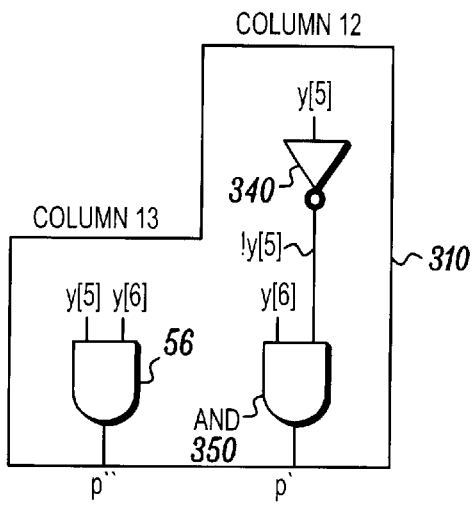
FIG. 3C shows an alternative embodiment of the portion of FIG. 3B.

An alternative embodiment of portion 310 is shown in FIG. 3C. AND gate 56 logically AND's bit y[5] and y[6] to generate partial product bit p". An inverter 340 inverts bit y[5] to generate bit !y[5]. An AND gate 350 logically AND's bits !y[5] and y[6] to generate bit p'.

The above embodiments reduce the required number of partial product bit generators required to square. Furthermore, the required tree structure for adding the partial product bits is simplified. Therefore, what is provided is a faster squaring circuit and method that requires less space than conventionally known.

Although the principles of the present invention are described with reference to specific embodiments, these embodiments are illustrative only and not limiting. Many other applications and embodiments of the principles of the present invention will be apparent in light of this disclosure and the claims set forth below.

For example, although the lower bits are described above as being deleted while the upper bits are shifted left, the upper bits may be deleted while the lower bits are shifted left one bit as shown in the following example.

| | |
|---|---|
| 001110011010 | (922) |
| x001110011010 | (922) |
| 0 0 | 0 |
| 0 1 | 1 |
| 0 00 | 2 |
| 1 110 | 3 |
| 0 1010 | 4 |
| 0 00000 | 5 |
| 0 000000 | 6 |
| 1 1011010 | 7 |
| 1 10011010 | 8 |
| 0 110011010 | 9 |
| 0 0000000000 | a |
| +00000000000 | b |
| 000011001111100010100100 | (850,084) |
| 22221111111111 | |
| 3210987654321098765432100 | (Column #) |

For clarity, the most significant bit of the lower bits for each partial product is represented above a corresponding mirror bit of equal weight. Here, where only the upper bits are deleted, the partial product bit generators (corresponding to multiplicand bit k) for the non-mirror bits each receive a bit of weight $2^k$ and a bit of weight $2^m$ and generate a bit of weight $2^{(k+m+1)}$, where m an integer is less than k.

Alternatively, a combination of upper and lower bits may be deleted so that there are no upper (or lower) bits that has a corresponding lower (or upper) bit. The remaining partial product bits are shifted left 1 bit.

| | |
|---|---|
| 001110011010 | (922) |
| x001110011010 | (922) |
| 00 00 00 0 | 0 |
| 00 10 10 1 | 1 |
| 0 00 00 0 | 2 |
| 11 01 1 0 | 3 |
| 01 00 1 10 | 4 |
| 00 00 0 00 | 5 |
| 0 00 0 00 | 6 |
| 11 1 11 0 | 7 |
| 01 1 01 10 | 8 |
| 00 1 00 01 | 9 |
| 0 0 00 00 | a |
| +0 00 00 0 | b |
| 000011001111100010100100 | (850,084) |
| 22221111111111 | |
| 3210987654321098765432100 | (Column #) |

In this example, the following partial product bits mk are deleted: 03, 04, 07, 08, $0a_{16}$, $0b_{16}$, 10, 14, 15, 18, 19, $1b_{16}$, 20, 21, 25, 26, 29, $2a_{16}$, 31, 32, 36, 37, $3a_{16}$, $3b_{16}$, 42, 43, 47, 48, $4b_{16}$, 50, 53, 54, 58, 59, 60, 61, 64, 65, 69, $6a_{16}$, 71, 72, 75, 76, $7a_{16}$, $7b_{16}$, 82, 83, 86, 87, $8b_{16}$, 90, 93, 94, 97, 98, $a_{16}0$, $a_{16}1$, $a_{16}4$, $a_{16}5$, $a_{16}8$, $a_{16}9$, $b_{16}1$, $b_{16}2$, $b_{16}5$, $b_{16}6$, $b_{16}9$ and $b_{16}$. The other bits mk are shifted left 1 bit. Here, the partial product bit generators for the non-mirror bits each receive a bit of weight $2^k$ and a bit of weight $2^m$ and generate a bit of weight $2^{(k+m+1)}$, where m is an integer not equal to k.

The above describes a squaring circuit in which there are no bits mk that have a corresponding bit km. However, the advantages of the present invention may be obtained, although to a lesser extent, by only shifting left a single bit (e.g., bit $1b_{16}$) and deleting the corresponding bit (e.g., bit $b_{16}1$) as in the following example.

```
              001110011010      (922)
             x001110011010      (922)
              000000000000       0
            0 01110011010        1
             000000000000        2
              001110011010       3
              001110011010       4
             000000000000        5
            000000000000         6
            001110011010         7
           001110011010          8
           001110011010          9
          000000000000           a
         +0000000000 0           b
         ─────────────────
         00001100111110001010010 0      (850,084)
         22221111111111
         3210987654321098765432 10      (Column #)
```

The above described embodiments are illustrative only. Many other embodiments and variations will be apparent in light of this disclosure. The invention is defined by the following claims.

I claim:

1. A squaring circuit for computing a square of an n-bit integer, the squaring circuit comprising:

an AND array providing, for at least one bit of weight $2^k$ of the n-bit integer:

(a) a first partial product bit generator having a first and second input terminal configured to respectively receive the bit of weight $2^k$ of the n-bit integer, and a bit of weight $2^m$ of the n-bit integer, m being an integer less than n, the first partial product bit generator configured to logically AND the bit of weight $2^k$ and the bit of weight $2^m$ to generate a bit of weight $2^{(k+m+1)}$ of a first partial product;

(b) a second partial product bit generator having a first and second input terminal configured to respectively receive the bit of weight $2^k$ of the n-bit integer, and the bit of weight $2^{(k+m+1)}$ of the first partial product, the second partial product bit generator configured to logically AND the bit of weight $2^k$ and the bit of weight $2^{(k+m+1)}$ of the first partial product to generate a second partial product;

(c) a third partial product bit generator having a first and second input terminal configured to respectively receive the bit of weight $2^k$ of the n-bit integer, and the bit of weight $2^{(k+m+1)}$ of the first partial product, the third partial product bit generator configured to logically XOR the bit of weight $2^k$ and the bit of weight $2^{(k+m+1)}$ of the first partial product to generate a third partial product;

column adders receiving the second partial product from the second partial product bit generator and the third partial product from the third partial product bit generator to provide a sum representing the square of the n-bit integer in redundant form;

and a carry propagate adder generating the square of the n-bit integer from the redundant form.

2. A method for computing a square of an n-bit integer comprising:

for at least one bit of weight $2^k$ of the n-bit integer:

(a) logically AND'ing the bit of weight $2^k$ of the n-bit integer and a bit of weight $2^m$ of the n-bit integer to generate a bit of weight $2^{(k+m+1)}$ of a first partial product in a first partial product bit generator implemented in an AND array, wherein k and m are integers less than n;

(b) logically AND'ing the bit of weight $2^k$ and the bit of weight $2^{(k+m+1)}$ of the first partial product to generate a second partial product in a second partial product bit generator implemented in the AND array;

(c) logically XOR'ing the bit of weight $2^k$ and the bit of weight $2^{(k+m+1)}$ of the first partial product to generate a third partial product in a third partial product bit generator implemented in the AND array; and receiving the second partial product from the second partial product bit generator and the third product from the third partial product bit generator into column adders to generate the square of the n-bit integer in a redundant form, and accumulating the square in the redundant form in a carry propagate adder to generate the square of the n-bit integer.

* * * * *